No. 714,432. Patented Nov. 25, 1902.
B. H. ALVEY.
CONVEYER.
(Application filed Apr. 26, 1902.)
(No Model.) 2 Sheets—Sheet 1.
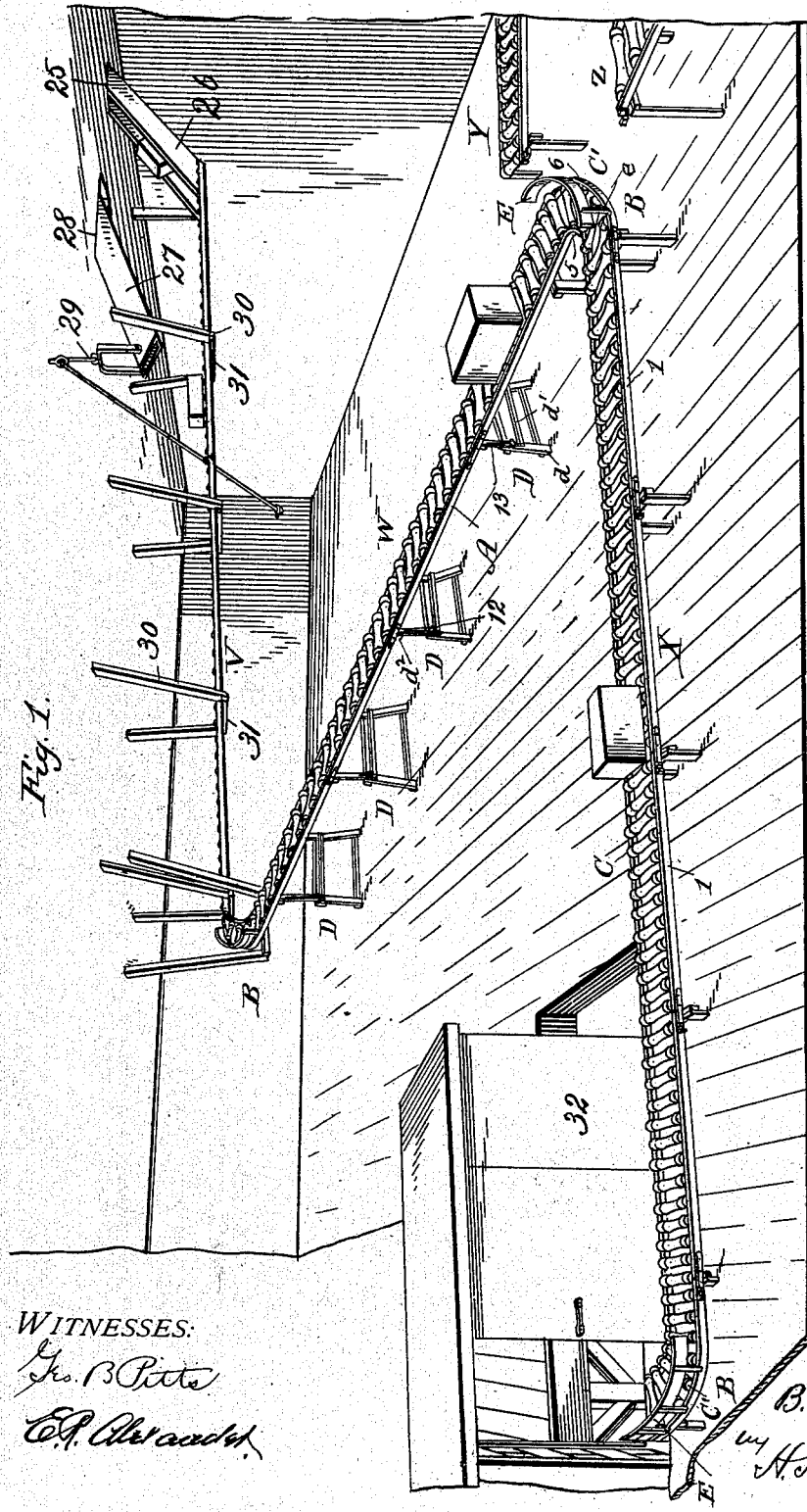
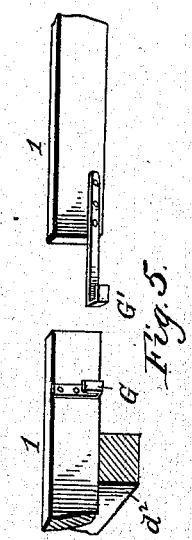
WITNESSES:
INVENTOR
B. H. Alvey
by H. N. Low Attorney No. 714,432. Patented Nov. 25, 1902.
B. H. ALVEY.
CONVEYER.
(Application filed Apr. 26, 1902.)
(No Model.) 2 Sheets—Sheet 2.
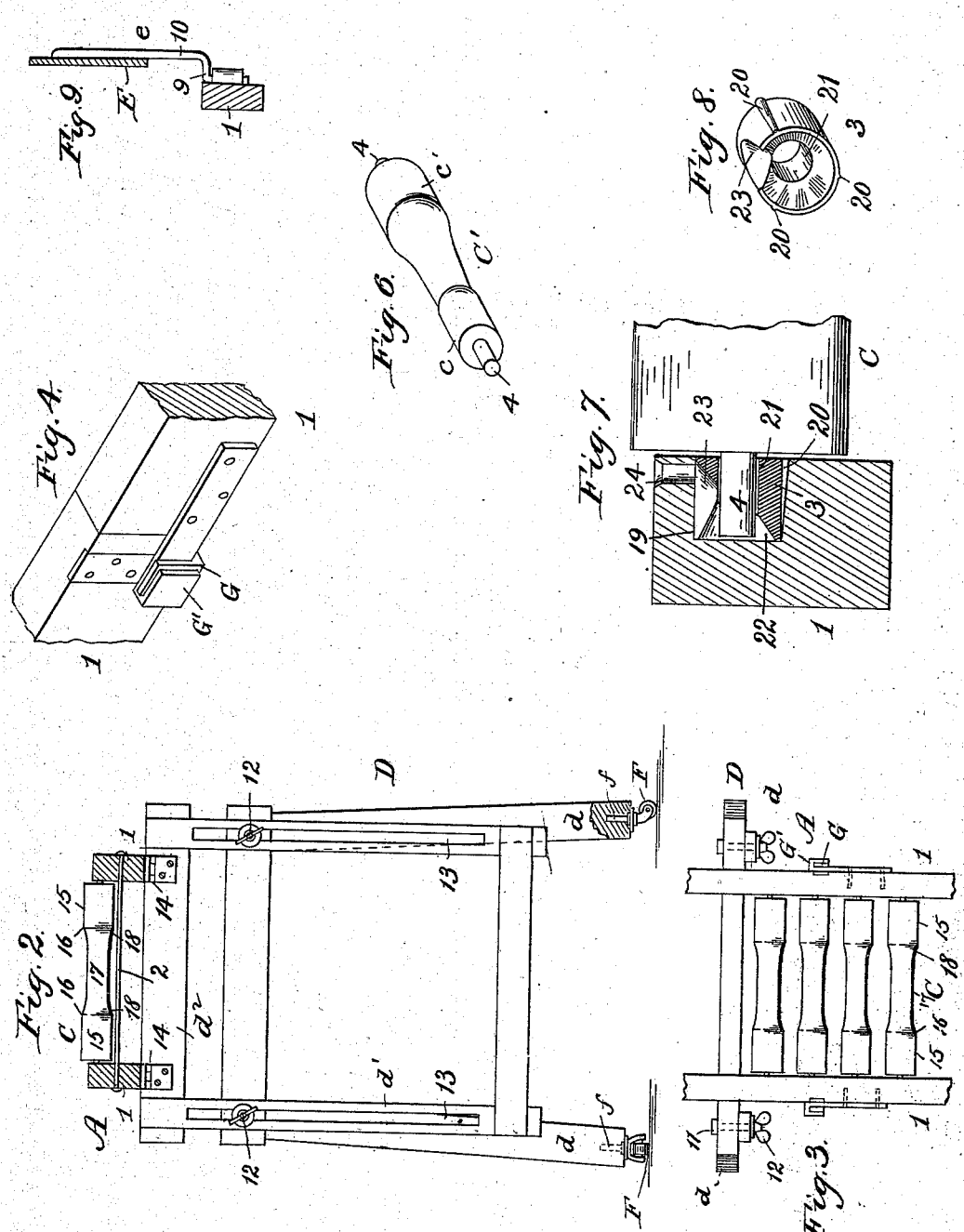
Witnesses.
Geo. B. Pitts
E. A. Alexander
Inventor:
B. H. Alvey
by H. N. Low atty.

UNITED STATES PATENT OFFICE.

BENJAMIN H. ALVEY, OF LOUISVILLE, KENTUCKY, ASSIGNOR TO THE ALVEY-FERGUSON CO., OF LOUISVILLE, KENTUCKY, A CORPORATION OF KENTUCKY.

CONVEYER.

SPECIFICATION forming part of Letters Patent No. 714,432, dated November 25, 1902.

Application filed April 26, 1902. Serial No. 104,827. (No model.)

*To all whom it may concern:*

Be it known that I, BENJAMIN H. ALVEY, a citizen of the United States, residing at Louisville, in the county of Jefferson and State of Kentucky, have invented new and useful Improvements in Conveyers, of which the following is a specification.

My invention relates to conveyers for the purpose of transferring goods from place to place—such as boxes, barrels, and packages—the movement of the packages or other articles being ordinarily effected by gravity; but it is to be understood that the invention is not confined necessarily to a conveyer on which the articles are moved by that force alone.

The important features of the invention are available where the goods are moved by hand or other power.

The invention has for its objects to enable goods to be transferred from one point to another, as in a warehouse, expeditiously and with a minimum of hand labor and to allow of the apparatus being adjusted to receive goods at different points, and to deliver them at different points as may be required, expeditiously and with certainty.

With such objects in view the invention consists in the parts and combinations thereof hereinafter set forth and claimed.

In order to make the invention more clearly understood, I have shown in the accompanying drawings means for carrying the same into practical effect without limiting my improvements in their useful applications to the particular constructions which, for the sake of illustration, I have delineated.

In said drawings, Figure 1 is a perspective view showing a conveyer of portable character embodying my invention set up in a warehouse for the transfer of goods from one point to another. Fig. 2 is a transverse sectional view of a portion of the same on a larger scale. Fig. 3 is a plan view of a portion of the same. Fig. 4 is a perspective view, on a larger scale, of a portion of the conveyer. Fig. 5 is a similar view with the parts disengaged. Fig. 6 is a view of one of the rollers for the conveyer-turn. Fig. 7 is a sectional view of the roller-bearing. Fig. 8 is a perspective view of the bearing. Fig. 9 is a sectional view showing the guard-rail.

Referring to the drawings, A indicates one of the straight sections of the conveyer; B, one of the curved sections or turns, which is incorporated in the conveyer at a point where its direction is to be changed; C, the conveying-rollers of the straight sections; C', the rollers of the curved section or sections, and D one of the adjustable supporting devices by which the conveying portion of the apparatus is sustained at the desired height and angle.

Each of the straight sections A comprises side pieces 1, of wood or other suitable material, united at suitable points by transverse connecting members or tie-rods 2. These side pieces have formed in them or attached to them bearings 3 for the shafts or journals 4 of the transverse rollers C. The latter are spaced apart, but are sufficiently close together to enable the goods to be conveyed to pass from one roller to the next without falling through. The curved sections B are constructed on similar principles, but with inner and outer curved side pieces 5 and 6, the rollers C' of said curved sections being arranged on lines radial to the center of the curve on which the section is constructed. I find that a convenient size for average warehouse purposes is a curved section having about a seven-foot radius. The journals of the rollers C' are mounted in inner and outer bearings in or on the side pieces 5 and 6, the inner bearings being closer together than are the outer bearings. The curved section comprises a guard-rail E, mounted on the side piece 6 by supports e, the latter comprising outwardly-extending arms 9, by which the rail is carried outward to a little distance from the outer part of the curved section, and upwardly-extending parts 10, to which the guard is attached, Fig. 9. This guard is, however, to be considered as a safety appliance, the curved section being adapted to properly turn the goods arriving upon it without the assistance of the rail E. This is accomplished by making the rollers C' of substantially the shape shown, Fig. 6, with inner ends c of small diameter and outer ends c' of materially larger diameter, so as to turn or deflect the package passing over it sufficiently to deliver the package in the proper direction to the succeeding straight portion of the conveyer or other desired point of delivery.

Combined with the sections A and B, above described, are adjustable supports the preferred form of which is illustrated at D, comprising means for sustaining the sections of the conveyer at any desired height within limits and at an angle, if desired. Such angular adjustment is not confined to making one end of the conveyer higher than the other, but includes means whereby one side of the conveyer may be made higher than the other, this latter feature being useful in adjusting the curves and enabling the outer side of the curve to be elevated a little, if necessary, to keep descending packages at about the middle of the curve. As shown, each support D comprises a frame $d$, adapted to rest on the floor or ground, and a frame $d'$, having a cross-piece $d^2$, on which the conveyer-section rests. One of said frames is provided with bolts 11, having set-nuts 12, and the other of said frames is formed with slots 13, through which said bolts pass. This construction allows the frame $d'$ to be adjusted vertically on the frame $d$, and said arrangement of bolts and slots being duplicated with a bolt and slot at each side of the support D an angular adjustment may be effected transversely of the conveyer by adjusting one side of the frame $d'$ a little higher than the other. A little looseness or play of the slotted frame on the bolts allows such adjustment.

Each of the frames $d$ is provided with reversible caster-wheels F on vertical pivots $f$, enabling the conveyer as a whole or sections thereof to be shifted from place to place, as required, with great convenience.

While the conveyer-sections may merely rest upon the cross-pieces $d^2$, I prefer to secure them by hinges, as shown at 14. This prevents any sliding of the section upon the cross-piece, but at the same time allows of the various adjustments above described and also permits the support D to be folded against the bottom of the section when the conveyer is dismantled for any purpose, so that the conveyer may be packed or stored in a comparatively small space. Each conveyer-section has one of the supports D secured to it at or near one end of the section. The other end is sustained by the support under the contiguous end of the next section. This is effected by the firm connection of the various sections end to end. An efficient means for this purpose consists in an upwardly and downwardly extending hook G and a longitudinally-extending hook G', the said hooks being adapted to interlock, as shown, Fig. 4. The hooks G are attached to the section end having the support D, and the hooks G' are attached to the section end that has no such support. Thus when the conveyer-sections are united one to another they are not only supported at both ends vertically, but are securely held from longitudinal movement or separation from one another.

A conveyer built up of the separable and joinable sections, as described, may be set up in various positions, inclinations, and directions and readily changed from place to place and readjusted for practically all the requirements of a store or warehouse in the shifting and storing of goods and packages generally.

In order that packages may run smoothly from a straight section to a curved section, the rollers C' have their inner bearings relatively higher than the outer bearings to bring the tops of the rollers C' substantially level or even with the tops of the rollers of the straight section.

The action of the conveyer-rollers C as I have constructed them is very peculiar and efficient to keep boxes, pails, and various kinds of packages on the conveyer while they descend the same by gravity. This renders the use of side boards, guards, or rails to keep articles on the conveyer entirely unnecessary, reducing the weight and expense of construction of the apparatus. Even at the turns of the conveyer I employ the guard E only to prevent the crowding of packages off, which may result by their being fed to the conveyer more rapidly than they are taken off at the bottom, their consequent coming in contact with each other, and a lateral crowding of one another at the turns or bends. Otherwise the shape of the rollers C' is such as to take the packages safely around the bend without the aid of a guard-rail.

The peculiar shape of the rollers C, above referred to, consists, essentially, in making them at their ends with straight cylindrical portions 15, extending for, say, four inches (on a roller sixteen inches long) where said straight portions terminate at peripheral shoulders 16. Between said shoulders the roller has a recess or inwardly-curved portion 17 about one-quarter of an inch deep— that is to say, the roller is at its middle about one-half an inch less in diameter than the diameter of the straight portions 15. At 18 the surface of the part 17 inclines gradually upward from the middle of the roller to the shoulder 16, which latter is preferably slightly rounded, as indicated. The effect of this construction is that as a box or package descends, the conveyer by gravity riding on the tops of the rollers, its normal bearing being on the parts 15, if one side or corner of the package gets in advance or rides off the part 15 into the recess of the roller the other side of the package will travel faster, while the part on the smaller part of the roller will be retarded, the final result being that the package is shifted back automatically onto both of the straight parts 15. This constantly tends to keep the package in a median position on the conveyer. I find that this operation is the same even with articles having rounded bottoms, such as pails. The rollers should, however, be set with their axes near enough together to give the article to be transported a bearing always upon at least two rollers. For ordinary purposes I find a very efficient construction to be to make the parts 15 about two and three-quarters inches in diameter and fix the roller-axes about six inches apart. For transporting pails and smaller packages I prefer to make the rollers about four inches apart from axis to axis.

The general construction of the rollers C' is substantially the same as that last above described, excepting that their outer ends are made larger than their inner ends, as already set forth.

The great number of bearings to be provided for the rollers in a conveyer of this type requires a construction of bearing which can be made and applied to the side pieces rapidly and cheaply and which in use will meet all the requirements for convenient oiling and for retaining the oil for a considerable time. To this end the bearings 3, above referred to, are of peculiar construction, (see Figs. 7 and 8,) consisting of short cylindrical metal tubes driven into holes 19, bored in the inner sides of the side pieces 1. While the main body of the bearing is cylindrical, it has exterior tapering ribs 20, which cut into the material of the side pieces and secure the bearing in place.

Interiorly the bearing has a cylindrical seat 21 at its outer end adapted to receive the roller-journal 4, and at its inner end is tapered or hollowed out to form an oil-retaining chamber 22. Communicating with this chamber is an opening 23 through the top of the bearing, and leading to the opening 23 is an oil-hole 24, bored through the upper part of the side piece 1 into the hole 19.

The capacity for adjustment of the conveyer for transfer of goods to various destinations is very great. In Fig. 1 it is shown as adapted to receive packages from an upper floor through an opening 25 and chute 26. A chute 27, leading from another floor or point of loading, comes through an opening 28 and has adjustable suspending means 29, by which it may be arranged so as not to interfere with packages coming from the chute 26. This receiving part V of the conveyer is shown as supported from the ceiling by suspension devices 30, from the bottom bars 31 of which the conveyer-sections are removable to be set up in another place.

The extreme delivery end of this conveyer is shown as leading into a freight-car 32. At Y and Z are shown further runs of the conveyer, which may be joined with the main run W (cutting out the run X to the freight-car) by substituting for the curved section a straight section to unite the runs W and Z, or by reversing the curve or turn B to unite with the runs W and Y. This latter may be done by turning the curved section B upside down or by substituting a different curved section to meet the requirements of the position and angle of the run Y relative to the run W.

It is highly important that the rollers shall revolve freely under packages of relatively light weight, to which end the rollers must not be too heavy or have too much inertia. On the other hand, they must be strong enough to carry heavy weights when required. I have constructed the rollers, after much experimentation, of a material which meets both of these requirements. They are made from a pulp of hard fiber of relatively light specific gravity known as "leatheroid." They are thus also seamless, without grain, and not liable to crack.

What I claim is—

1. In a portable conveyer, the combination of a plurality of sections provided with transverse rollers, and supports for said sections, the upper part of each support being hinged to the conveyer-section and the lower part of each support being adjustable on said upper part.

2. In a conveyer, the combination of a plurality of sections, each section having at one end a support and upwardly-extending hooks G, and having at the other end outwardly-extending hooks G' adapted to be sustained by the hooks G, whereby the support at one end of each section sustains the contiguous end of the next section, substantially as set forth.

3. In a gravity conveyer, the combination, with the straight sections, of a curved section having rollers C' of greater diameter at their outer ends than at their inner ends, said rollers having shoulders 16 and intermediate recessed portions 17, substantially as set forth.

4. In a gravity conveyer, the combination with a straight section having a series of rollers, of a curved section having rollers C' of greater diameter at the outer ends than at their inner ends, said rollers being freely and independently rotatable, substantially as set forth.

5. In a portable conveyer, the combination of a plurality of sections, upper frames $d'$ having cross-pieces connected transversely of the conveyer from side to side of said frames, and lower frames $d$ having transverse cross-pieces and adjustably supporting the frames $d'$, substantially as set forth.

6. In a gravity conveyer, the combination of a series of separately and freely rotatable rollers, and means for supporting the same to form an inclined way, said rollers being constructed with shoulders 16 and intermediate recessed portions, and adapted to automatically maintain packages in the middle of said way, substantially as set forth.

7. In a gravity conveyer, having a bend or turn, the combination of a series of rollers C having cylindrical end portions, shoulders at the inner ends of said portions, and central recesses, rollers C' at the turn of said conveyer having inner and outer supporting portions, those at the inner side of the turn being smaller than those at the outer side of the turn, and having central recessed portions, and means for supporting said rollers to form an inclined way.

8. The combination of the upper run of the conveyer, the suspending devices on which the same is removably supported, the lower run of the conveyer, and the two-part adjustable frames D, substantially as set forth.

9. In a gravity conveyer, the combination of an inclined way having a series of freely and independently rotatable rollers, a chute 26 adapted to deliver to the upper portion of said way, and a chute 27 adapted to deliver to the way below the said chute 26, the chute 27 being adjustable out of the way of articles traveling on said rollers from the chute 26, substantially as set forth.

In testimony whereof I affix my signature in presence of two witnesses.

BENJAMIN H. ALVEY.

Witnesses:
J. G. A. BOYD,
LOUISE C. STARK.